United States Patent [19]

Inoue

[11] 4,308,022
[45] Dec. 29, 1981

[54] APPARATUS FOR BINDING SMOKING CASINGS

[75] Inventor: Kiyoshi Inoue, Abiko, Japan

[73] Assignee: Kureha Kagaku Kogyo Kabushiki Kaisha, Nihonbashi, Japan

[21] Appl. No.: 97,282

[22] Filed: Nov. 26, 1979

[30] Foreign Application Priority Data

Nov. 29, 1978 [JP] Japan .................................. 53-146602
Sep. 12, 1979 [JP] Japan .................................. 54-116090

[51] Int. Cl.³ .......................... B31B 1/86; B31B 23/14
[52] U.S. Cl. ...................................... 493/214; 493/226; 493/234; 493/383; 493/926
[58] Field of Search ............ 493/233, 234, 226, 224, 493/926, 345, 344, 360, 362, 380, 383, 214, 223, 229, 232, 237; 53/138 A, 138 R, 134; 17/33, 34

[56] References Cited

U.S. PATENT DOCUMENTS

| | | | |
|---|---|---|---|
| 3,147,673 | 9/1964 | Hilton | 493/226 X |
| 3,168,016 | 2/1965 | Kehr | 493/234 X |
| 3,348,458 | 10/1967 | Tipper | 493/383 X |
| 4,106,395 | 8/1978 | Rochla | 493/234 |
| 4,165,593 | 8/1979 | Niedecker | 153/138 A X |

Primary Examiner—James F. Coan
Attorney, Agent, or Firm—Sughrue, Mion, Zinn, Macpeak & Seas

[57] ABSTRACT

A method and apparatus for producing smoking casings in which a web of tubular casing material is perforated in the widthwise direction at predetermined intervals. The web is then creased by roller discs and folded in a strip-like configuration. A doubly-folded band of plastic material having a notched portion is inserted between one of the creases and the assembly then clamped with a metal ring around the notched portion. Finally, the end of the web is clamped, then rotated in a direction tangent to the feeding direction of the web of casing material so as to tear completed casings from the web.

5 Claims, 9 Drawing Figures

APPARATUS FOR BINDING SMOKING CASINGS

BACKGROUND OF THE INVENTION

The invention relates to a method and an apparatus for primary binding of a tubular casing especially a fibrous casing used in smoking processed meat products such as roast ham, boneless ham or the like in which one end of the casing is bound.

With reference to FIG. 1, it has been known to provide a salted meat product with a fibrous casing 1 having a length of several tens centimeters for smoking a sausage-shaped meat product. In such a casing, a looped string 2 for hanging the product is, as shown in FIG. 1, attached to the fibrous casing 1 retained by a metal ring 3. If necessary, a number of punched holes 4 each having a diameter of about 3 mm are formed near the metal ring 3 of the fibrous casing shown in FIG. 1 in order to permit air to escape therethrough when the casing is filled with the meat product.

Also, if desired, a number of smaller needled holes 5 may be provided over the fibrous casing in order to permit smoke to permeate. The needled holes also serve to discharge extra moisture or fat in the product outwardly. Finally, the end of the fibrous casing opposite the string is bound as a second binding after the casing is filled with the meat product. The final product is shown in FIG. 2.

In manufacturing such casings, a web of fibrous casing material is fed from a supply roll of the casing material and cut into predetermined lengths. Thereafter, in the prior art technique, the casing is manually converged at one end with a crease and bound by using a metal ring with a doubly folded string in the form of a loop thereby providing the primary binding. However, even a skilled person can produce no more than ten such casings per minute. Consequently, there is a demand for automatic production of casings also because the work is tiresome and simple.

Accordingly, an object of this invention is to provide a method and an apparatus for automating the above-described primary binding work and for automatically perforating (punching if necessary) creating creases, folding the creases, binding the casing using a metal ring with a string, and tearing the casing at the perforated holes.

SUMMARY OF THE INVENTION

In accordance with this and other objects of the invention, there is provided a method and apparatus for producing and binding of smoking casings. A web of casing material is drawn from a roll of tubular casing material provided at one side of the apparatus. The drawn web is perforated in the widthwise direction thereof to produce lines of perforated holes at predetermined intervals corresponding to the desired length of the completed casings. Next, the web of material is creased in the longitudinal direction by sets of rollers which include upper and lower lines of desks which partially overlap one another. The casing is then folded. Next, a doubly-folded band of plastic material with sufficient rigidity is inserted between creases in the web of material. The band has a cut-away portion around which a metal ring is placed to knot the web of casing material. The end of the web of the casing material is then clamped in a frame ahead of the next line of perforated holes. The clamping member is then rotated along a line tangent to the feeding direction of the web of casing material so as to tear the web of casing material along the line of perforated holes so as to sever completed casings from the web.

DESCRIPTION OF THE PREFERRED EMBODIMENT

Figure 1:
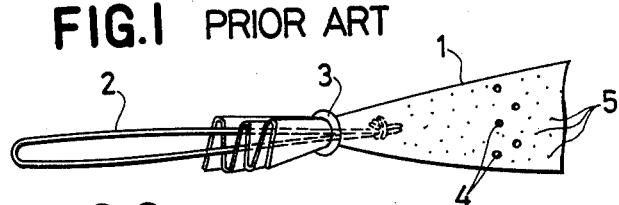
FIG. 1 is a partial perspective view of a string provided fibrous casing where the primary binding is carried out according to the prior art.
Figure 2:
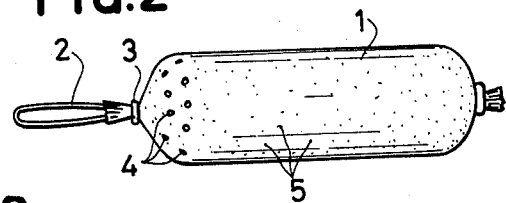
FIG. 2 is a side view of the casing shown in FIG. 1, which is filled with meat and in which secondary binding is carried out.
Figure 3:
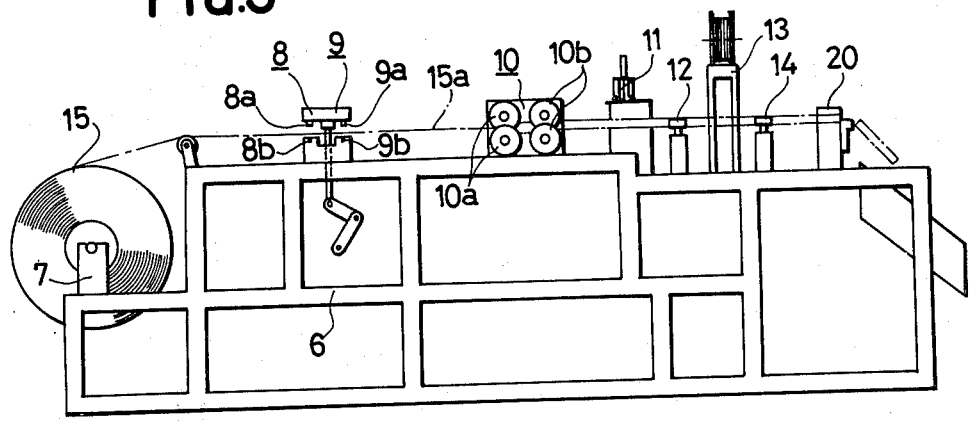
FIG. 3 is a side view of a preferred embodiment of an apparatus according to the present invention.
Figure 4:
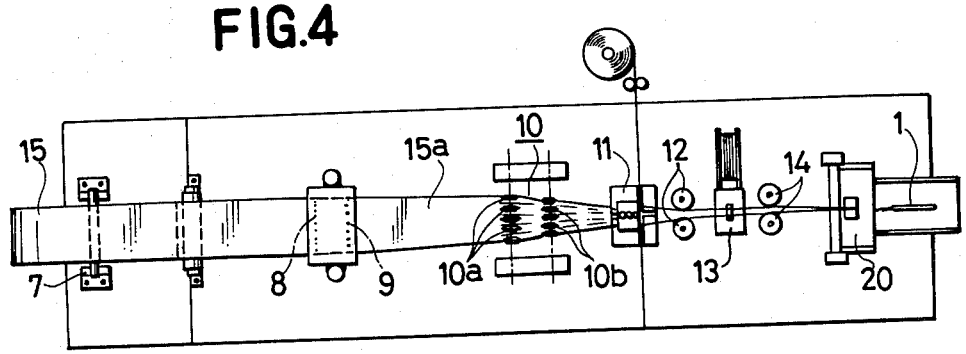
FIG. 4 is a plan view of the apparatus of FIG. 3.

The invention will hereinafter be described with reference to the accompanying drawings. FIG. 3 is a side view of an apparatus according to the present invention. FIG. 4 is a topside plan view thereof.

In FIGS. 3 and 4, reference numeral 6 designates a frame, 7 a casing material roller bracket, 8 a perforating station, 9 a punching station, 10 a creasing station, 11 a string or band providing mechanism, 12 a folding and transferring station, 13 a knotting or tying station, 14 intermittent feeding rollers, 20 a tearing mechanism, and 15 a casing material wound on the casing material roller and fed through the apparatus in the forward direction by the intermittent feeding rollers. The term "forward direction" as used herein represents the direction in which the casing material is drawn.

The perforating station 8 and the punching station 9 are mounted on the same body which includes male dies 8a and 9a and fixed female dies 8b and 9b. The body is reciprocatingly moved by a driving source (not shown) attached to the frame 6 so that perforated holes and punched-out holes may be simultaneously formed. The creasing station includes multiple pairs of upper and lower creasing rollers 10a and 10b in the form of discs disposed as shown in FIG. 4. Each creasing roller is partly disposed into the space between the adjacent rollers. With this structure, the casing material 15a is creased as it passes the creasing rollers. The distance between the adjacent rollers 10b is narrower than that of the adjacent rollers 10a due to the folding and transferring station. The folding and transferring station 12 includes a pair of pinch rollers having axes perpendicular to the axes of the creasing rollers by which the casing material web 15a is drawn, folded and transferred to the next station.

Figure 5:
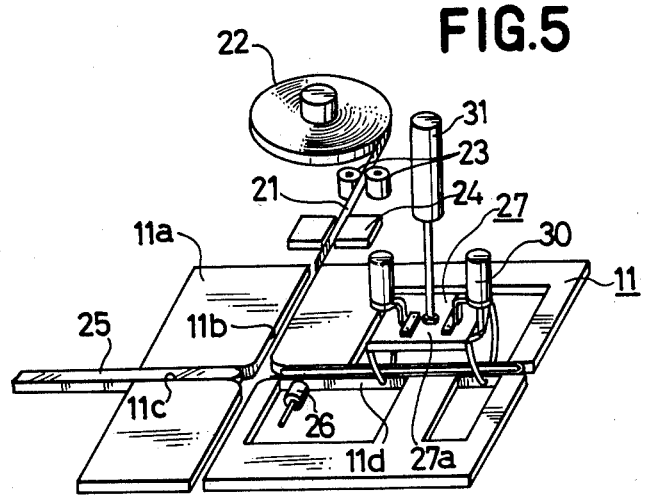
FIG. 5 is a perspective view of a band providing mechanism used with the apparatus of FIGS. 3 and 4.

FIG. 5 is a perspective view of an exemplary construction of the band providing mechanism 11 in which the band material is cut at predetermined lengths. The cut band is folded into a U-shape and placed between the creases of the casing. This mechanism will next be described.

Figure 6:
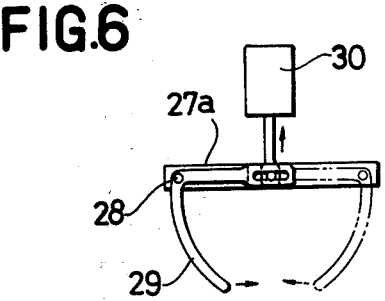
FIG. 6 is a schematic side view of a clamping device used with the invention.

A synthetic resin band 21 of a width of less than 10 mm is preferably used having some rigidity but with sufficient flexibility that it will not bend due to the gravitational force. The band may be made, for example, of polypropylene, such as the so-called PP band which is widely used for packaging applications. The band 21 is drawn from a reel 22 and is pinched by a pair of feeding rollers 23 and fed into a groove 11b in a base plate 11a of the mechanism 11. The feeding rollers 23 are intermittently rotated at a constant speed to thereby feed the band at constant length segments under the control of an external control device (not shown). When the rollers 23 are stopped, cutters 24 are actuated to cut the band 21. Then a push rod 25 is advanced along a groove 11c perpendicular to the groove 11b in the right hand direction so that the cut band is pushed into a groove 11d at the center of the band 21 with the band doublefolded. Next, a cutter 26 is moved toward the band 21 cutting a notch along one side of the band with a length of 10 to 20 mm (See FIG. 7). The cutter 26 preferably includes a male die for shearing and also a thermoelectric member in the form of an oblong member for contact melt cutting of the band. Then, the doublefolded band is transported and disposed between the creases of the casing positioned in the lower portion of the mechanism 11 using a finger structure 27. In order to clamp the band 21, an upper part of each bell crank 29, which is pivotally mounted on a base member 27a around a pivot 28 is, as shown in FIG. 6, lifted by an air cylinder 30 moving both lower ends of bell crank 29 closer to each other. Thus, the band 21 is disposed between the creases of the casing by lowering the base member 27a with the use of an air cylinder. The band must be inserted between the creases at such a position that the cut-away portion 21a in the band is positioned just behind the perforations. The cut-away portion 21a in the band is knotted together with the casing 15a by the knotting mechanism 13a using a metal ring.

Figure 7:
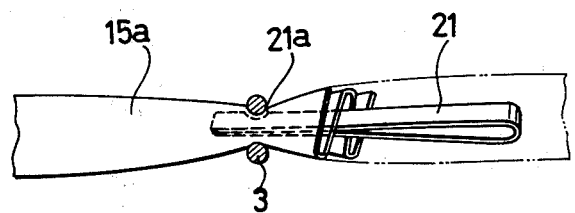
FIG. 7 is a cross-sectional view taken in the area of the clamping ring of a casing produced in accordance with the present invention.

FIG. 7 shows the knotted state in which a half of the metal ring is omitted for clarity wherein the band 21 is inserted into the metal ring. If the band 21 is provided in advance with concave portions, the cutter 26 for forming the cut-away portion 21a may be dispensed with.

Figure 8:
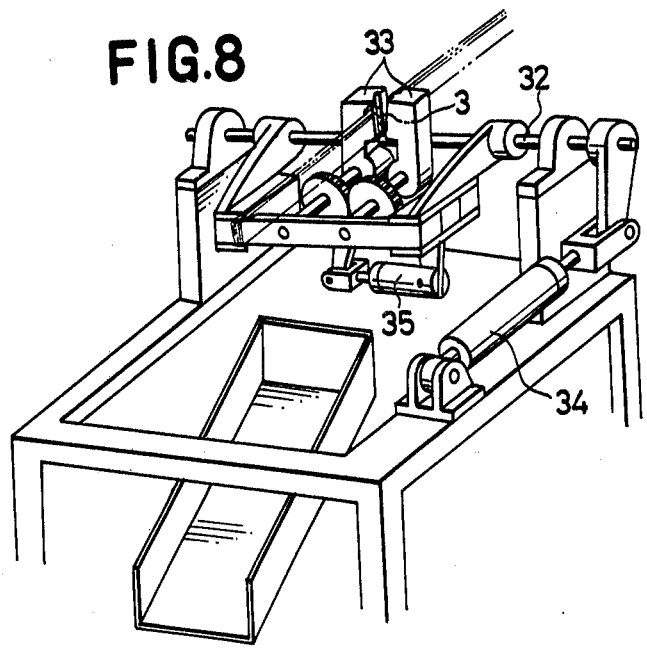
FIGS. 8 and 9 illustrate the operation of a tearing mechanism used with the invention.
Figure 9:
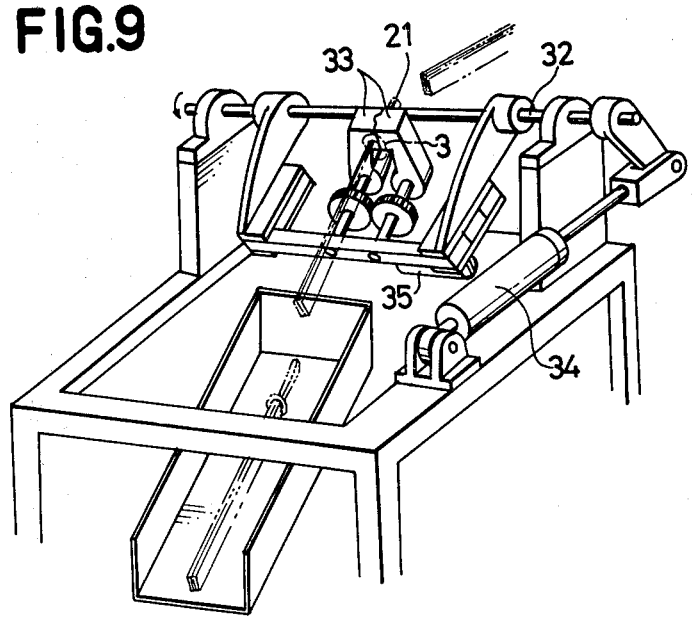

FIGS. 8 and 9 show the preferred structure of the tearing mechanism 20. FIG. 8 illustrates the state in which the casing has just been clamped and FIG. 9 shows the rotation and ejection of a completed casing. A clamper 33 supported by a rotatable shaft 32 clamps the folded casing 15a ahead of the perforated holes as shown in FIG. 8. The clamper 33 is rotated about the rotatable shaft 32 in the direction designated by the arrow, that is, in the circumferential direction which is tangent to the linear direction of the casing feed. Tension is concentrated at the perforated holes and the casing is torn away and severed from the casing material web. Reference numerals 34 and 35 designate air cylinders for rotating the rotatable shaft and actuating the clamper 33, respectively. The driving order of each mechanism is established through a programming structure in a well-known manner. The detailed explanation thereof is thus omitted.

As mentioned above, the present invention provides a method by which the tubular fibrous casing material initially wound on a roller is perforated and punched, if necessary, while being transported. The casing is then creased, provided with a band having a suitable strength and folded and thereafter the individual completed casings are torn from the continuous roll using the perforations. By using a synthetic resin band, it is unnecessary to form a knot in the string because the simple cut-away portion formed in the resin band functions as a stop. Further, according to the present invention, the successive band providing operation can be effectively automated using long band material. In addition, the band according to the present invention has a rigidity making the meat product easy to handle and hang facilitating its smoking, transporting and displaying.

What is claimed is:

1. An apparatus for binding smoking casings comprising:
   means for mounting a roll containing a web of casing material;
   means for forming a passage for said web of casing material;
   means disposed at a first position along said passage for perforating said web of casing material at predetermined intervals to provide lines of perforated holes;
   a plurality of rollers for creasing, folding and transporting said web of casing material, said plurality of rollers including first and second sets of rollers, each of said sets comprising plural parallel-mounted rollers and said first and second sets of rollers being disposed vertically with respect to one another;
   means for supplying a band of strap material;
   means for forming said strap material into a loop;
   means for disposing said loop of band material adjacent a creased end of said web of casing material;
   means for knotting said end of said web of casing material; and
   means for tearing said web of casing material along a perforated line of holes formed by said perforating means.

2. An apparatus for binding smoking casings comprising:
   means for mounting a roll containing a web of casing material;
   means for forming a passage for said web of casing material;
   means disposed at a first position along said passage for perforating said web of casing material at predetermined intervals to provide lines of perforated holes;
   a plurality of rollers for creasing, folding and transporting said web of casing material;
   means for supplying a band of strap material;
   means for forming said strap material into a loop;
   means for disposing said loop of band material adjacent a creased end of said web of casing material;
   means for knotting said end of said web of casing material; and
   means for tearing said web of casing material along a perforated line of holes formed by said perforating means, said tearing means comprising a clamper for clamping the casing material ahead of said perforated line; and
   means for rotating said clamper in a circumferential direction tangent to the feeding direction of said web of casing material to tear completed casings from said web.

3. The smoking casings binding apparatus of claim 2 further comprising means for cutting a notch in said band of strap material.

4. The smoking casings binding apparatus of claim 3 wherein said notch cutting means comprises heating means.

5. Apparatus for binding smoking casings comprising:
- means for supplying a web of tubular casing material;
- means for perforating said casing material in the widthwise direction thereof at predetermined intervals to form lines of perforated holes;
- a plurality of rollers for creasing said web of casing material in the longitudinal direction thereof, said plurality of rollers including first and second sets of rollers, each of said sets comprising plural parallel-mounted rollers and said first and second sets of rollers being disposed vertically with respect to one another;
- means for folding said web of casing material;
- means for providing a folded band between creases in said web of casing material at a forward end thereof, said band being doubly-folded and having a cut-away portion;
- means for knotting said web of casing material at a position around the cut-away portion of said band ahead of a line of perforated holes, said knotting means including means for securing a metal ring around said cut-away portion;
- means for clamping said web of casing material ahead of said line of perforated holes; and
- means for rotating said clamping means in a circumferential direction tangent to the feeding direction of said web of casing material to tear completed casings from said web.

* * * * *